US009675041B2

(12) United States Patent
Eriksson et al.

(10) Patent No.: US 9,675,041 B2
(45) Date of Patent: Jun. 13, 2017

(54) LEG SPREADING DEVICE TO BE MOUNTED IN A MILKING STALL

(71) Applicant: DELAVAL HOLDING AB, Tumba (SE)

(72) Inventors: Jan Eriksson, Tumba (SE); Henrik Olander, Tumba (SE)

(73) Assignee: DELAVAL HOLDING AB, Tumba (SE)

(*) Notice: Subject to any disclaimer, the term of this patent is extended or adjusted under 35 U.S.C. 154(b) by 2 days.

(21) Appl. No.: 14/440,602

(22) PCT Filed: Nov. 19, 2013

(86) PCT No.: PCT/SE2013/051363
§ 371 (c)(1),
(2) Date: May 5, 2015

(87) PCT Pub. No.: WO2014/081379
PCT Pub. Date: May 30, 2014

(65) Prior Publication Data
US 2015/0296742 A1   Oct. 22, 2015

Related U.S. Application Data

(60) Provisional application No. 61/728,895, filed on Nov. 21, 2012.

(30) Foreign Application Priority Data

Nov. 21, 2012   (SE) .................................... 1251314-9

(51) Int. Cl.
*A01K 37/00*   (2006.01)
*A01K 1/12*   (2006.01)
(Continued)

(52) U.S. Cl.
CPC ................ *A01K 1/12* (2013.01); *A01J 5/0175* (2013.01); *A01J 7/00* (2013.01); *A01K 1/126* (2013.01)

(58) Field of Classification Search
CPC ........ A01K 1/12; A01K 1/126; A01K 1/0005; A01K 1/0209; A01K 1/06; A01K 1/0606;
(Continued)

(56) References Cited

U.S. PATENT DOCUMENTS 741,669 A * 10/1903 Jacobson ............... A01K 15/04
119/810
747,552 A * 12/1903 Jacobson ............... A01K 15/04
119/810
(Continued)

FOREIGN PATENT DOCUMENTS

AU         156728 S       10/2004
EP      0 194 729 A1      9/1986
(Continued)

OTHER PUBLICATIONS

International-Type Search Report, dated May 15, 2013, from corresponding PCT application.
(Continued)

*Primary Examiner* — Jennifer E Novosad
(74) *Attorney, Agent, or Firm* — Young & Thompson

(57) ABSTRACT

A leg spreading device for an animal in a milking stall includes a first and second elongated elements forming a first raised surface provided with a left side edge and a second raised surface provided with a right side edge. The elongated elements are oriented in a manner such that a transverse distance (w) between the left side edge of the first raised surface and the right side edge of the second raised surface increases continuously in a longitudinal direction of the elongated elements from a first transverse distance in the
(Continued)

first longitudinal position to a second transverse distance in a second longitudinal position.

20 Claims, 4 Drawing Sheets

(51) Int. Cl.
*A01J 5/017* (2006.01)
*A01J 7/00* (2006.01)

(58) Field of Classification Search
CPC .... A01K 15/028; A01K 15/04; A01K 1/0613; A01K 15/00; A01K 29/00; A01J 7/00; A01J 5/0175; A61D 3/00; A61D 2003/006
USPC ........ 119/712, 516, 520, 522, 814, 816–820, 119/14.18
See application file for complete search history.

(56) References Cited

U.S. PATENT DOCUMENTS

| | | | | |
|---|---|---|---|---|
| 1,014,910 A * | 1/1912 | Sharit | ............... | A01K 15/04 119/816 |
| 1,270,814 A * | 7/1918 | Grove | ............... | A01K 15/04 119/810 |
| 1,447,840 A * | 3/1923 | Eades | ............... | A01K 15/04 119/819 |
| 1,549,386 A * | 8/1925 | Schallan | ............... | A01K 15/04 119/810 |
| 1,633,020 A * | 6/1927 | Ingram | ............... | A01K 15/04 24/116 R |
| 1,817,845 A * | 8/1931 | Reichert | ............... | A01K 15/04 119/810 |
| 2,357,426 A * | 9/1944 | Richards | ............... | A01K 13/005 119/810 |
| 2,762,334 A * | 9/1956 | Allen | ............... | A01K 15/04 119/820 |
| 2,955,571 A * | 10/1960 | Krahn | ............... | A01K 1/0613 119/755 |
| 4,186,688 A * | 2/1980 | Gaitan | ............... | A61D 3/00 119/712 |
| 4,838,207 A * | 6/1989 | Bom | ............... | A01J 5/0175 119/14.02 |
| 4,941,433 A * | 7/1990 | Hanauer | ............... | A01J 5/0175 119/14.02 |
| 5,713,301 A * | 2/1998 | van der Lely | ............... | A01J 5/0175 119/14.02 |
| 7,293,775 B1 * | 11/2007 | Donnelly | ............... | A63B 69/0068 119/839 |
| 2014/0331934 A1* | 11/2014 | Eriksson | ............... | A01K 1/126 119/14.04 |
| 2015/0296742 A1* | 10/2015 | Eriksson | ............... | A01J 5/0175 119/712 |

FOREIGN PATENT DOCUMENTS

| | | |
|---|---|---|
| EP | 0 560 438 A2 | 9/1993 |
| EP | 0 562 655 A2 | 9/1993 |
| EP | 0 619 941 A2 | 10/1994 |
| GB | 2 249 016 A | 4/1992 |
| NZ | 575037 A | 3/2011 |
| RU | 2 067 821 C1 | 10/1996 |
| SU | 1175404 A | 8/1985 |
| SU | 1667761 A1 | 8/1991 |
| WO | 2009/113884 A2 | 9/2009 |
| WO | 2011/098994 A2 | 8/2011 |
| WO | 20111114138 A1 | 9/2011 |

OTHER PUBLICATIONS

International Search Report, dated Feb. 24, 2014, from corresponding PCT application.
Supplementary International Search Report, dated Jan. 30, 2015, from corresponding PCT application.

* cited by examiner

LEG SPREADING DEVICE TO BE MOUNTED IN A MILKING STALL

THE BACKGROUND OF THE INVENTION AND PRIOR ART

The present invention relates to a leg spreading device to be mounted in a milking stall, wherein the leg spreading device comprises a first raised surface defined by a left side edge and a second raised surface defined by a right side edge, and wherein the leg spreading device is mounted in a position in the milking stall such that the raised surfaces is located between the rear legs of an animal standing in a milking position in the milking stall and wherein a transverse distance (w) between the left side edge of the first raised surface and the right side edge of the second raised surface defines the width between the rear legs of the animal.

In parallel milking parlour systems, the milking stalls may be arranged on a rotary platform or at a pit. The teat cups may here be attached to the teats of the cows in the milking stalls via the space between the rear legs of the cows. The teat cups may be manually attached by an operator or automatically attached by a robot arm from a non-operating position at a rear edge portion of the milking stalls. When a robot arm is used, it is important that the rear legs are at a suitable distance from each other such that it is possible to move the robot arm and the teat cups via the space between the rear legs without hitting the legs.

NZ 575037 shows a leg spreader to be arranged in a milking stall in order to secure that a sufficient space is created between the rear legs of an animal. The leg spreader has a raised surface difficult to stand on with a substantially constant width in a lateral direction which defines a desired space between the rear legs of an animal. It is here a risk that an animal places the rear legs at a relatively long distance from the rear edge portion of the milking stall such that it is difficult for an operator or a robot arm to reach the teats from a position outside a rear edge of the milking stall.

AU 156728 S shows a leg spreading device formed as a unit with two parallel raised surfaces. The transverse distance between the outer side edges of the raised surfaces are parallel. It is also in this case a risk that an animal places the rear legs at a relatively long distance from the rear edge portion of the milking stall.

SUMMARY OF THE INVENTION

The object of the present invention is to perform a leg spreading device which defines a desired space between the rear legs of an animal in a milking stall at the same time as it motivates an animal to place the rear legs in a desired longitudinal position in the milking stall.

These objects are achieved by the initially mentioned leg spreading device which is characterised by the feature that the leg spreading device comprises a first elongated element forming the first raised surface and a second elongated element forming the second raised surface, wherein said elongated elements are oriented in a manner such that the transverse distance between the left side edge of the first elongated element and the right side edge of the second elongated element increases continuously in a longitudinal direction of the elongated elements from a first transverse distance at a first longitudinal position to a second transverse distance at a second longitudinal position.

In case, the distance between the rear legs of an animal is greater than a natural distance, it feels uncomfortable for an animal. If the distance between the rear legs increases further, it becomes more and more uncomfortable for the animal. The lateral distance between the side edges of the raised surfaces has a minimum at the first longitudinal position and a maximum at the second longitudinal position. Since the lateral distance between the side edges varies in the longitudinal direction of the elongated elements, it motivates an animal to move the rear legs to the most comfortable longitudinal position. The minimum lateral distance at the first longitudinal position corresponds at least to a desired space between the rear legs such that it is possible for an operator or a robotic manipulation device to use the space for attaching teat cups to the teats. Preferably, the first transverse distance at the first longitudinal position is at least 16 cm. Such a minimum distance between the rear legs forms a space which is usually large enough for an operator or a robotic manipulation device to use when they attach teat cups to the teats of an animal.

According to an embodiment of the invention, the first transverse distance between the left side edge of the first elongated element and the right side edge of the second elongated element corresponds to or is larger than a most comfortable distance between the rear legs of animals milked in the milking stall. In this case, the leg spreading device motivates all animals which are milked in the milking stall to position the rear legs in substantially one and the same longitudinal position, namely in the first longitudinal position of the milking stall.

According to an embodiment of the invention, the leg spreading device is mounted in a position in the milking stall such that the first longitudinal position is located closed to a rear edge of the milking stall. In this case, the rear legs of the animals are placed in the vicinity of the rear edge portion of the milking stall. Such a positioning of the rear legs makes it easy for an operator or a robotic manipulation device to reach the teats and attach teat cups or perform treatments of the teats from a position outside the rear edge of the milking stall.

According to an embodiment of the invention, the transverse distance between the left side edge of the first elongated element and the right side edge of the second elongated element increases linearly in the longitudinal direction of the elongated elements from the first longitudinal position to the second longitudinal position. In this case, the left side edge and the right side edge have a linear extension and they form a constant angle in relation to each other and a centre longitudinal vertical plane through the leg spreading device. Alternatively the left side edge of the first elongated element and the right side edge of the second elongated element may be more or less curved.

According to an embodiment of the invention, said elongated elements have a longitudinal length of at least 25 cm between the first longitudinal position and the second longitudinal position. The longitudinal length of the elongated elements must be sufficiently long such that an animal is not able to place the rear legs in front of the second longitudinal position of the leg spreading device. Especially short animals may be able to place the rear legs in front of the second longitudinal position.

According to an embodiment of the invention, the elongated elements formed raised surfaces which are located at least 5 cm above the floor surface in the milking stall. Preferably, the raised surfaces are located up to 10 cm above the floor surface in the milking stall. With such a height of the raised surfaces, it is possible for an animal to move the front legs over the leg spreading device when entering the milking stall. At the same time, the raised surfaces have a height such it is uncomfortable for an animal to stand on the raised surfaces. Preferably, the raised surfaces of the leg spreading device slopes at least partly in relation to a floor surface in the milking stall. A raised sloping surface is very difficult to stand on.

According to an embodiment of the invention, the first elongated element and the second elongated element are symmetrically arranged on opposite sides of a central vertical longitudinal plane through the leg spreading device. The symmetrically arranged elongated elements have side edges which affect on the respective rear legs of an animal in a similar manner.

According to an embodiment of the invention, the first elongated element comprises a right side edge arranged in parallel with its left side edge and the second elongated element comprises a left side edge arranged in parallel with its right side edge. In this case, the elongated elements have a constant width. However, the inner side edges of the elongated elements may form an angle to the outer side edges of the elongated elements such that the width of the elongated elements varies in a longitudinal extension.

According to an embodiment of the invention, the leg spreading device comprises an additional element forming an additional raised surface of the leg spreading device which is at least partly arranged in a space between the first elongated element and the second elongated element. In case the first positioning element and the second positioning element have a relatively small width, a relatively large intermediate space is formed between the first positioning element and the second positioning element. The floor surface in the intermediate space might be the floor surface in the milking stall. There is a risk that an animal places one of the rear hooves in this intermediate space. By means of the additional element, an additional raised surface is arranged in the intermediate space which reduces the floor surface in the intermediate space to a size such that the above mentioned risk is substantially eliminated.

According to an embodiment of the invention, the leg spreading device comprises an additional element forming an additional raised surface of the leg spreading device which is at least partly arranged in front of the second longitudinal position. The additional element forms an additional raised surface in front of the elongated elements in order to avoid an animal to place a hoof of one of the rear legs in front of the elongated elements.

According to an embodiment of the invention, the leg spreading device comprises an adjusting mechanism allowing an adjustment of the lateral distance between the left side edge of the first elongated element and the right side edge of the second elongated element. Such a mechanism may display the elongated elements in relation to each other. The adjusting mechanism may move one of the elongated elements while the other elongated element is in a stationary position. Alternatively the adjusting mechanism may move both elongated elements. The adjusting mechanism may be controlled manually or by a control unit.

According to an embodiment of the invention, the adjusting mechanism may allow adjustment of the first lateral distance between the left side edge of the first elongated element and the right side edge of the second elongated element. It is here possible to adjust the minimum lateral distance between the elongated elements and the space between the rear legs of an animal to a desired size. In this case, the elongated elements may be pivotally arranged at the second longitudinal position and the adjusting mechanism may perform a pivot motion of the elongated elements in order to adjustment the lateral distance between the elongated elements at the first longitudinal position. Alternatively or in combination, the elongated elements may be pivotally arranged at the first longitudinal position. In this case, the adjusting mechanism may perform a pivot motion of the elongated elements in order to adjust the angle between the elongated elements. The elongated elements may, for example, be adjusted to a parallel position in relation to each other when an animal enters or leaves the milking stall. In such a position, the elongated elements constitute a significantly smaller obstacle to an animal entering or leaving the milking stall.

According to an embodiment of the invention, the leg spreading device comprises an elevating mechanism configured to move the elongated elements between a raised position in which an upper surface of the elongated elements are at a certain height above a floor surface in the milking stall and a lowered position in which the upper surface of the elongated elements are at a lower height above the floor surface than in the raised position. The lowered position may be located at the same height level or below the floor surface in the milking stall. It is here possible to move the elongated elements to the lower position when an animal enters the milking stall and leaves the milking stall. The elevating mechanism elevates the elongated elements to the raised position when it is necessary to create a desired space between the rear legs of an animal and to position the rear legs in a desired longitudinal position in the milking stall.

According to an embodiment of the invention, the elongated elements are separate units which are individually mounted in a milking stall. The elongated elements may be attached in a desired position on the floor surface in the milking stall by means of suitable fastening means such as bolts. The elongated elements may have a body manufactured by a plastic material or by a suitable metal material. Alternatively, the elongated elements are connected to each other by means of a connection member such they are mounted as a unit in a milking stall. Such a leg spreading device may be a molded or compression molded unit. The elongated elements may be pre-mounted on a support plate or the like whereupon the support plate and the elongated elements are mounted as a unit in the milking stall.

The invention also relates to a milking stall comprising a leg spreading device according to any one of the preceding claims. Such a milking stall may be arranged on an annular rotary platform. The rear legs of the animal may here be in a position at an inner edge portion or an outer edge portion of the platform. Advantageously, the leg spreading device is arranged in a mounting position with the first longitudinal position close to rear edge of the milking stall. The teat cups may be attached by an operator or a robotic manipulation device from a position located on the outside or on the inside of the annular platform.

Alternatively, the milking stall may have a rear edge located at a pit. In this case, the leg spreading device provides a positioning of the rear legs of an animal in the milking stall close to the pit and with a desired space between the rear legs. Thus, the existence of the leg spreading device makes it easy for an operator in the pit to reach the teats of an animal and attach teat cups to the animal via the space between the rear legs of the animal.

BRIEF DESCRIPTION OF THE DRAWINGS

The present invention is now to be explained more closely by means of preferred embodiments, which are disclosed as examples, and with reference to the attached drawings.

BRIEF DESCRIPTION OF PREFERRED EMBODIMENTS OF THE INVENTION

Figure 1:
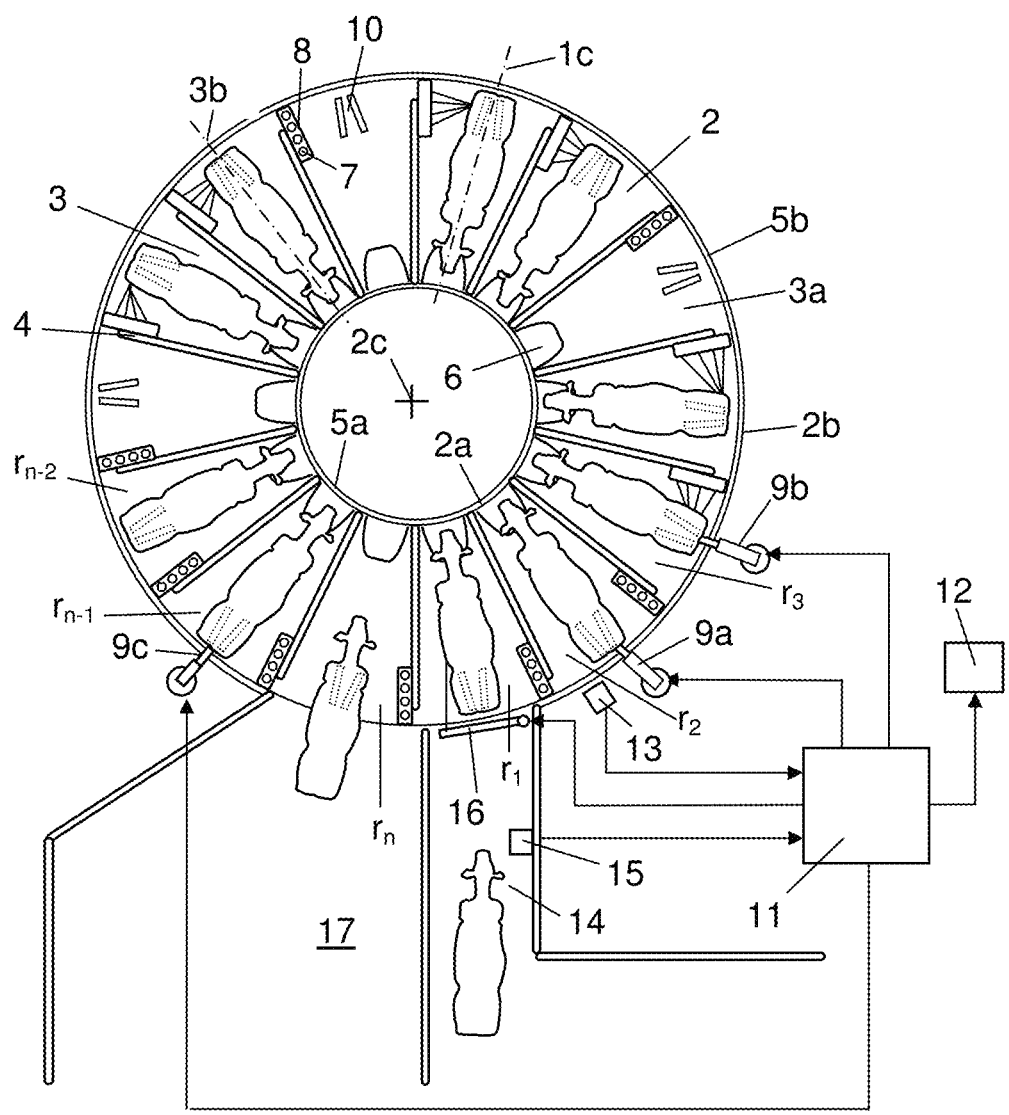
FIG. 1 shows a milking parlour with a rotary platform comprising milking stalls each provided with a leg spreading device according to the invention.

FIG. 1 shows a rotary parlour for milking of cows 1. The rotary parlour comprises an annular platform 2 having an inner edge portion 2a and an outer edge portion 2b. The platform 2 rotates around a vertical axis 2c during operation. A plurality of fence arrangements 4 are arranged on the platform 2. The fence arrangements 4 form milking stall 3 for receiving individual cows 1 in predetermined milking positions. The platform 2 has an upper surface forming a floor surface 3a for the cows 1 to stand on in the respective milking stalls 3. In this case, the fence arrangements 4 have an essentially straight radial extension on the platform 2 between an inner end located at the vicinity of the inner edge portion 2a of the platform and an outer end located at the vicinity of the outer edge portion 2b of the platform. The fence arrangements 4 are arranged at equal intervals around the annular platform 2. The rotary parlour is of the PR (Parallel Rotary) type and a longitudinal axis 1c of the cows 1 has a substantially radial extension on the annular platform 2 when they stand in a milking position in a milking stall 3. The cows 1 have here their heads at the inner edge portion 2a and the rear legs at the outer edge portion 2b of the platform 2. An inner fence arrangement 5a is mounted around a main part of the inner periphery of the platform 2. An outer fence arrangement 5b is mounted around a main part of the outer periphery of the platform 2. The object of the fence arrangements 5a, 5b is to prevent that the cows 1 in the milking stalls 3 step out of the platform 2.

Each milking stall 3 is provided with a feeding trough 6 arranged in the vicinity of the inner periphery 2a of the platform. Each milking stall 3 is also provided with four teat cups 7 to be attached to the teats of a cow 1 standing in the milking stall 3. Each teat cup 7 is provided with a milk conduit and a pulsation conduit. Each milking stall 3 comprises a teat cup magazine 8 adapted to hold the teat cups 7 when they are not used. A first robotic manipulation device 9a, a second robotic manipulation device 9b and a third robotic manipulation device 9c are arranged in different positions on a floor surface at the side of the platform 2. Each milking stall 3 is provided with a leg spreading device 10 for the rear legs of the cows 1.

A control unit 11 is adapted to control a schematically shown drive mechanism 12 for driving of the platform 2. The drive mechanism 12 may include a drive wheel mechanism, which is arranged in contact with a circular rail on the underside of the platform 2. A position sensor 13 is adapted to sense the rotational position of the platform 2 and to send a signal to the control unit 11 about the actual position of the platform 2. The rotary parlour comprises an entrance passage 14 to the platform 2. The entrance passage 14 is provided with a detecting sensor 15 and a movable gate 16. An exit area 17 is arranged in connection to the platform 2. The exit area 17 is entered by the cows 1 when they leave the platform 2.

The rotary milking parlour may be used for voluntary milking or batch milking. In this case, the rotary parlour is used for voluntary milking. If a cow 1 wants to be milked, she walks to the entrance passage 14 leading to the rotary platform 2. The entrance passage 14 has a width such that only one cow 1 at a time can be located in a front position of the passage 14. The detection sensor 15 detects when a cow 1 arrives to the front position of the passage 14 and sends a signal to the control unit 11 with this information. The detection sensor 15 may be an identification sensor sensing the identity of the cow 1. The gate 16 is in a closed position when the cow 1 arrives to the front position of the entrance passage 14.

The control unit 11 receives substantially continuously information from the position sensor 13 about the actual rotational position of the platform 2. When a milking stall 3 arrives to a first rotational position $p_1$, just in front of the gate 16, the control unit 11 opens the gate 16 and the cow 1 enters the platform 2. The gate 16 is moved to its closed position as soon as the whole cow 1 is inside the milking stall 3. The feeding trough 6 attracts the cow 1 and facilitates the positioning of the cow 1 in the milking stall 3. The leg spreading device 10, which is arranged in the vicinity of the outer edge portion 2b of the platform 2, has a shape such the cow 1 must arranged the rear legs at a distance from each other such that a desired space is formed between the rear legs. Furthermore, the leg spreading devices 10 motivate the cows 1 to position the rear legs in a longitudinal position close to the outer edge portion 2b of the milking stall 3. With such a positioning of the rear legs, it is easy for the robotic manipulation devices 9a, b, c to reach the udder of the cows 1 via the space between the rear legs.

When the milking stall 3 with the cow 1 has rotated to a second rotational position $r_2$, the control unit 11 activates the first robotic manipulation device 9a. The task of the first robotic manipulation device 9a is to perform a treatment of the teats of the cow 1 before the teat cups 7 are attached. This treatment may include a cleaning process of the teats. The first robotic manipulation device 9a uses the space between the rear legs of the cow 3 when it performs the treatment of the teats. When the milking stall 3 with the cow 1 has rotated to a third rotational position $r_3$, the control unit 11 activates the second robotic manipulation device 9b. The task of the second robotic manipulation device 9b is to fetch the teat cups 7 in the teat cup magazine 8 and attach them to the cow 1. The second robotic manipulation device 9b fetch the teat cups 7 in the teat cup magazine 8 and moves them to an attaching position below the teats of the cow 1 via the space between the rear legs of the cow 1. The platform 2 is driven with a speed such that it is no problem for the robotic manipulation devices 9a, 9b to compensate for the relative motions of the platform 2 when they perform their tasks.

The milking process of the cow 1 starts as soon as the teat cups have been attached to the teats of the cow 1. A milk meter (not shown) supervises the milk flow during the milking process. As soon as the milk flow drops below a predetermined value, a removing device (not shown) removes the teat cups 7 from the teats of the cow 1. The milking process proceeds during nearly one revolution of the platform 2. If the teat cups 7 have not been removed earlier, they are at least removed when the milking stall 3 reaches a third last rotational position $r_{n-2}$. The control unit 11 activates the third robotic manipulation device 9c when the milking stall 3 with the cow 1 arrives to a second last rotational position $r_{n-1}$. The task of the third robotic manipulation device 9c is to perform a treatment of the teats of the cow 1 after the milking process. The aftertreatment may be to spray a disinfecting medium on the teats of the cow 1. The third robotic manipulation device 9c may carry a spray nozzle or the like connected to a not shown container with disinfecting medium arranged at the side of the platform 2. The third robotic manipulation device 9c uses the space between the rear legs of the cow 1 when it moves the spray nozzle to a spray position in the vicinity of the teats of the cow 1. When the aftertreatment of the teats is finished and the milking stall 3 reaches a last rotational position $r_n$, the cow 1 leaves the milking stall 3 and enters the exit area 17.

Figure 2:
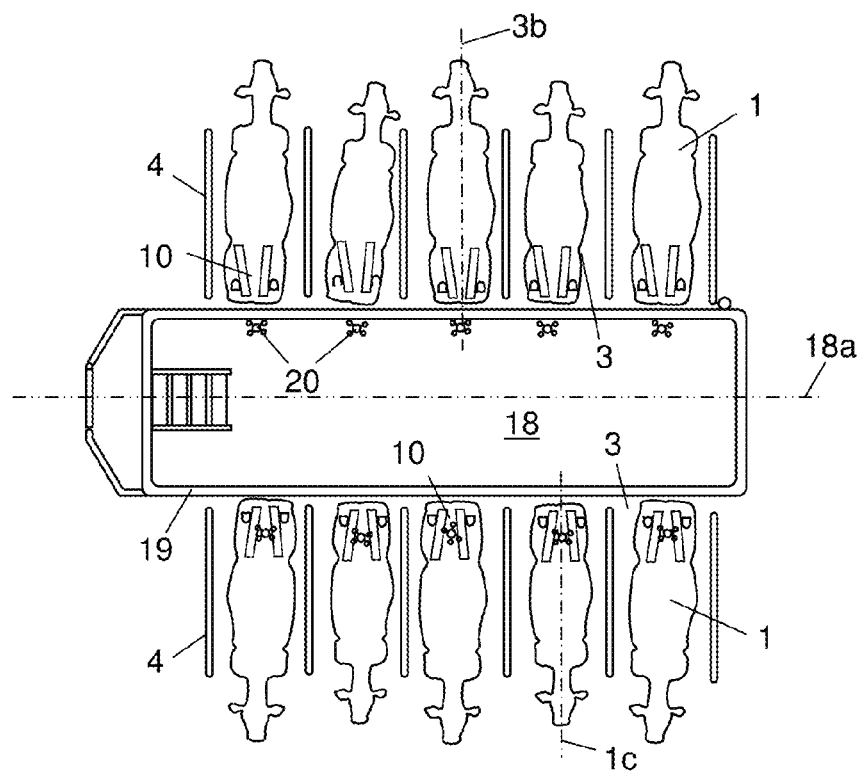
FIG. 2 shows a milking parlour with milking stalls arranged around a pit provided with leg spreading devices according to the invention.

FIG. 2 shows a milking parlour for milking of cows 1 comprising a pit 18 in which at least one operator works. The pit 18 has an elongated extension. A first group of milking stalls 3 is located on a first side of the pit 18 and a second group of milking stalls 3 is located on an second side of the pit 18. The milking stalls 3 are formed by fence arrangement 4 arranged in parallel at a distance from each other. In this case, each group comprises five milking stalls 3. Each milking stall 3 has a longitudinal extension from a rear edge arranged at the pit 18 to a front edge. A central longitudinal axis 3b through the milking stalls 3 and a longitudinal axis 1c of the cows form an angle of about 90° in relation to a vertical plane 18a through the pit 18. A fence arrangement 19 is arranged around the pit 18. The fence arrangement 19 prevents the cows 1 from stepping down into the pit 18. Each milking stall 3 is provided with a leg spreading device 10. The leg spreading device 10 provides a desired space between the rear legs of the cows 1. A further object with the leg spreading device 10 is to position the cows 1 in a milking position close to the rear edge of the milking stall 3 and the pit 18. With such a positioning of a cow 1 in a milking stall 3, it is easy for an operator in the pit 18 to reach the udder of the cow 1 and attach a milking member in the form of a cluster 20 to the cow 1 via the space between the rear legs.

Figure 3:
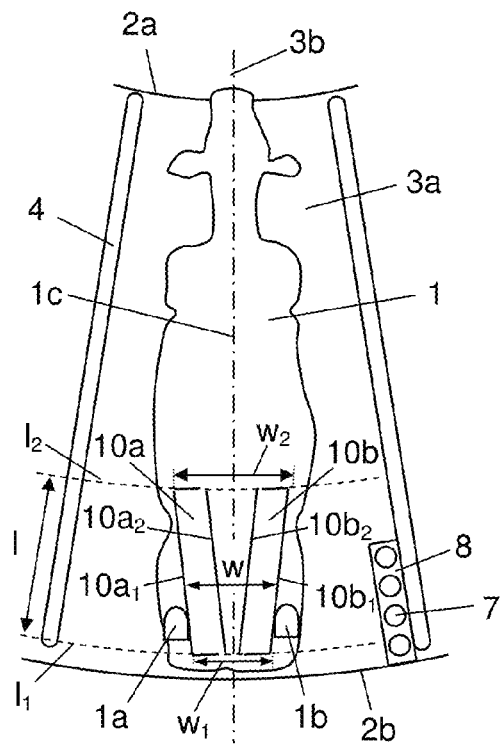
FIG. 3 shows a milking stall with a leg spreading device according to a first embodiment of the invention.

FIG. 3 shows a milking stall 3 on a rotary platform 2 provided with a leg spreading device 10. The milking stall 3 comprises a floor surface 3a having a longitudinal extension between a rear edge 2b and a front edge 2a of the milking stall 3. In this case, the rear edge of the floor surface 3a is defined by the outer edge portion 2b of a platform 2 and the front edge by the inner edge portion 2a of the platform 2. A central longitudinal plane 3b through the milking stall 3 is disclosed. The milking stall 3 comprises a rear zone in which it is possible for a cow 1 to place the rear legs 1a, 1b when the cow 1 has entered the milking stall 3. The rear zone has an extension in a longitudinal direction of the milking stall 3 between a first longitudinal position $I_1$ and a second longitudinal position $I_2$. It is desired that the rear legs 1a, 1b of a cow 1 is placed in the vicinity of the first longitudinal position $I_1$ which is located close to the rear edge 2b of the milking stall. Especially short cows 1 may place the rear legs 1b at a relatively long distance from the rear edge 2b of the milking stall 3.

The leg spreading device 10 is mounted in a position in the milking stall 3 such that a first raised surface and a second raised surface of the leg spreading device is located between the rear legs 1a, 1b of an animal 1 standing in a milking position in the milking stall 3. The leg spreading device 10 comprises a first elongated element 10a forming the first raised surface and a second elongated element 10b forming the second raised surface. The elongated elements 10a, 10b may be manufactured by a plastic material or a metal sheet material. The raised surfaces of the leg spreading device 10 may be arranged about 10 cm above the floor surface 3a in the milking stall. The raised surfaces may at least partly slope in relation to the floor surface 3a in the milking stall 3. The first elongated element 10a comprises a left side edge $10a_1$ and a right side edge $10a_2$. The side edges $10a_1$, $10a_2$ of the first elongated element 10a are rectilinear and arranged in parallel such the first elongated element has a constant width along its longitudinal extension. The second elongated element 10b comprises a right side edge $10b_1$ and a left side edge $10b_2$. The side edges $10b_1$, $10b_2$ of the second elongated element 10b are rectilinear and arranged in parallel such the second elongated element 10b has a constant width along its longitudinal extension. The left side edge $10a_1$ of the first elongated element 10a is configured to position the rear left leg 1a of an animal 1 in the milking stall and the right side edge $10b_1$ of the second elongated element 10b is configured to position the rear right leg 1b of an animal 1 in the milking stall.

The elongated elements 10a, 10b are oriented in a manner such that a transverse distance w between the left side edge $10a_1$ of the first elongated element 10a and the right side edge $10b_1$ of the second elongated element 10b increases continuously in a longitudinal direction of the elongated elements 10a, 10b from a first transverse distance $w_1$ at a first longitudinal position $I_1$ to a second transverse distance $w_2$ at a second longitudinal position $I_2$. In this case, the transverse distance w between the left side edge $10a_1$ of the first elongated element 10a and the right side edge $10b_1$ of the second elongated element 10b increases linearly in the longitudinal direction of the elongated elements 10a, 10b from the first longitudinal position $I_1$ to the second longitudinal position $I_2$. Thus, the transverse distance has a minimum $w_1$ at the first longitudinal position $I_1$ and a maximum $w_2$ at the second longitudinal position $I_2$.

The elongated elements 10a, 10b comprises a respective first end portion at the first longitudinal position $I_1$ and a respective second end portion at the second longitudinal position $I_2$. In this case, the first elongated element 10a and the second elongated element 10b are separate units which are individually mounted in the milking stall 3. The elongated elements 10a, 10b are symmetrically arranged on different sides on the central vertical longitudinal plane 3b through the milking stall 3. In this case, the leg spreading device 10 is mounted in a position in the milking stall 3 such that a central vertical longitudinal plane 3b of the milking stall coincides with a central longitudinal axis of the leg spreading device 10.

A cow 1 entering the milking stall 3 places the rear legs 1a, 1b on opposite sides of the central longitudinal plane 3a of the milking stall 3 and on opposite sides of the left side edge $10a_1$ of the first elongated element 10a and the right side edge $10b_1$ of the second elongated element 10b. A longitudinal axis 1c of the cow 1 may coincide with the central longitudinal plane 3a of the milking stall 3. The first transverse distance $w_1$ at the first longitudinal position $l_1$ creates a desired space between the rear legs 1a, 1b of a cow 1 for the robotic manipulation devices 9a, 9b, 9c. The first transverse distance $w_1$ at the first longitudinal position $I_1$ corresponds to or is larger than a most comfortable distance between the rear legs 1a, 1b for a cow 1. The transverse distance w increases continuously in a longitudinal direction from the first longitudinal position $I_1$ to the second longitudinal position $I_2$. A cow 1 which initially has placed the rear legs 1a, 1b at a longitudinal distance from the first longitudinal position $l_1$ adjusts instinctively the positions of the rear legs 1a, 1b to the most comfortable longitudinal position which in this case is the first longitudinal position. Thus, the design of the leg spreading device 10 motivates a cow 1 to place the rear legs 1a, 1b in the first longitudinal position $I_1$.

The leg spreading device 10 is mounted in a position in the milking stall 3 such the first longitudinal position $I_1$ is located close to a rear edge of the milking stall 3 at the outer edge portion 2b of the platform 2. Consequently, the rear legs 1a, 1b of the cows 1 will be positioned in the vicinity of the outer edge portion 2b of the platform 2. It is here easy for an operator or a robotic manipulation device 9a, b, c to reach the teats and attach teat cups or perform a treatment of the teats from a position from the outside of the platform 2 via the space between the rear legs 1a, 1b.

Figure 4:
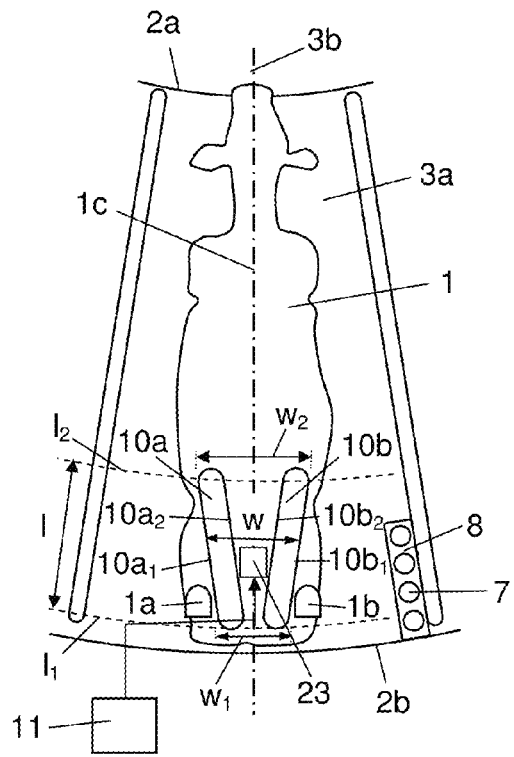
FIG. 4 shows a milking stall with a leg spreading device according to a second embodiment of the invention.

FIG. 4 shows an alternative embodiment of the leg spreading device 10. In this case, the elongated elements 10a, 10b has rounded end portions. The rounded end portions of the elongated elements 10a, 10b are here arranged somewhat in front of the second longitudinal position $I_2$ such that the transverse distance w will increase continuously from the first longitudinal position $I_1$ to the second longitudinal position $I_2$. In this case, the first elongated element 10a and the second elongated element 10b are movably arranged between a raised position and a lowered position by means of a schematically indicated elevating mechanism 23. The elevating mechanism 23 is controlled by a control unit 11. The control unit 11 controls the elevating mechanism 23 such that the elongated elements 10a, 10b is moved to the lowered position when a cow 1 enters and leaves the milking stall 3 and to the raised position when a cow 1 stands in a milking position in the milking stall 3. In this case, the leg spreading device 10 does not obstruct the cows 1 when they enter and leave the milking stall 3.

Figure 5:
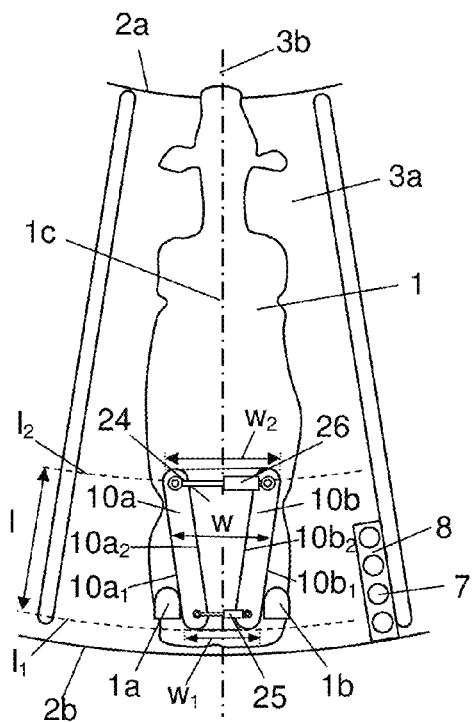
FIG. 5 shows a milking stall with a leg spreading device according to a third embodiment of the invention and, FIG. 6 shows a milking stall with a leg spreading device according to a fourth embodiment of the invention.

FIG. 5 shows a further alternative embodiment of the leg spreading device 10. In this case, the leg spreading device 10 comprise two elongated elements 10a, 10b symmetrically arranged around the central longitudinal vertical plane 3b in the milking stall 3. The elongated elements 10a, 10b are pre-mounted on a support plate 24. The support plate 24 and the elongated elements 10a, 10b are mounted as a unit on the floor surface 3a in the milking stall. The first positioning element 10a and the second positioning element 10b are movably mounted along tracks or the like in the support plate 24. A first length adjusting mechanism 25 connects the elongated elements 10a, 10b to each other at the first longitudinal position $I_1$. By adjusting the length of the first length adjusting mechanism 25, the lateral distance $w_1$ between the elongated elements 10a, 10b at the first longitudinal position $I_1$ will be adjusted. The lateral distance $w_1$ will be adjusted to a suitable value for the breed of cows 1 milked in the milking stall 3. The adjusting mechanism 25 may be a screw mechanism or the like which may be manually adjusted by an operator. Alternatively, the adjusting mechanism 25 may be a hydraulic, pneumatic or electric activated member or the like controlled by a manual button or a control unit 11.

A second length adjusting mechanism 26 connects the elongated elements 10a, 10b to each other at the second longitudinal position $I_2$. By adjusting the length of the second length adjusting mechanism 26, the lateral distance $w_2$ between the elongated elements 10a, 10b at the second longitudinal position $I_2$ will be adjusted. The lateral distance $w_2$ will be adjusted to a similar value as the lateral distance $w_1$ when a cow enters or leave the milking stall 3. In this case, the leg spreading device 10 does not essentially obstruct a cow 1 entering and leaving the milking stall 3. A control unit 11 may control the second length adjusting mechanism 26 which may be a hydraulic, pneumatic or electric activated member. The lateral distance $w_2$ may also be adjusted in order to adjust the angle between the side edges $10a_1$, $10b_1$ of the first and second elongated elements 10a, 10b. Alternatively, one length adjusting mechanism 25, 26 is used at one end portions the elongated elements 10a, 10b. The opposite end portions of the elongated elements 10a, 10b may be pivotally mounted in the support plate 24. In such a case, it is only possible to adjust one of the lateral distances $w_1$, $w_2$ while the other lateral distance distances $w_1$, $w_2$ is constant.

Figure 6:
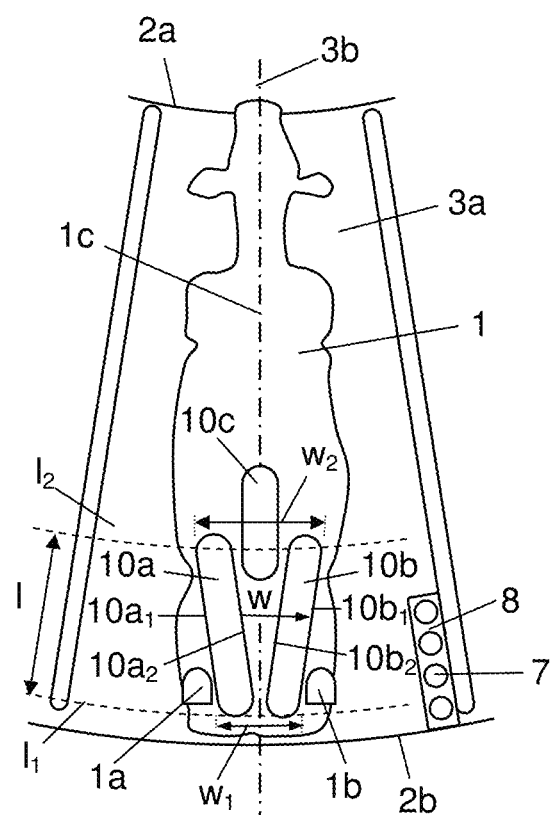

FIG. 6 shows a further alternative embodiment of the leg spreading device 10. In this case, the leg spreading device 10 comprises a third element 10c which forms an additional raised surface. In this case, one part of the raised surface of the third element 10c is placed in a space between the first elongated element 10a and the second positioning element 10b. Thereby, the floor surface in the intermediate space between the elongated elements 10b, 10c is reduced to a size such that it is not possible for a cow 1 to place a hoof of one of the rear legs 1a, 1b in said space. A remaining part of the raised surface of the third positioning element 10c is placed in front of the second longitudinal position $I_2$. The object of this additional raised surface is to prevent that a cow 1 places a hoof of one of the rear legs 1 b in front of the second longitudinal position $I_2$.

The invention is not restricted to the described embodiments but may be varied freely within the scope of the claims.

The invention claimed is:

1. A leg spreading device (10) in combination with a milking stall, the leg spreading device (10) being attached on a floor surface of the milking stall (3), the leg spreading device (10) comprising:
    a first elongated element (10a) forming a first raised surface (10a) defined by a left side edge (10a1); and
    a second elongated element (10b) forming a second raised surface (10b) defined by a right side edge (10b1),
    wherein the first and second elongated elements (10a, 10b) are attached in a position on the floor surface of the milking stall (3) such that a transverse distance (w) between the left side edge (10a1) of the first raised surface and the right side edge (10b1) of the second raised surface increases continuously in a longitudinal direction of the first and second elongated elements (10a, 10b) from a first transverse distance (w1) at a first longitudinal position (l1) to a second transverse distance (w2) at a second longitudinal position (l2), and, when an animal (1) is standing in a milking position on the floor surface of the milking stall (3), the first and second raised surfaces (10a, 10b) are located between rear legs (1a, 1b) of the animal (1), the leg spreading device (10) being attached in the position on the floor surface of the milking stall (3) such that, when an animal (1) is standing in a milking position on the floor surface of the milking stall (3), the first and second raised surfaces (10a, 10b) are located between the rear legs (1a, 1b) of the animal (1) standing in the milking position in the milking stall (3).

2. The leg spreading device according to claim 1, in combination with the milking stall, wherein the first transverse distance (w1) at the first longitudinal position (l1) is at least 20 cm.

3. The leg spreading device according to claim 1, in combination with the milking stall, wherein said first and second elongated elements (10a, 10b) are attached in the position on the floor surface of the milking stall (3) such that the first longitudinal position (l1) is located adjacent a rear edge (2b) of the milking stall (3).

4. The leg spreading device according to claim 1, in combination with the milking stall, wherein the transverse distance (w) increases linearly in the longitudinal direction of the elongated first and second elements (10a, 10b) from the first longitudinal position (l1) to the second longitudinal position (l2).

5. The leg spreading device according to claim 1, in combination with the milking stall, wherein said first and second elongated elements (10a, 10b) have a longitudinal length of at least 25 cm between the first longitudinal position (l1) and the second longitudinal position (l2).

6. The leg spreading device according to claim 1, in combination with the milking stall, wherein the first raised surface (10a) and the second raised surface (10b) are located at least 5 cm above the floor surface in the milking stall.

7. The leg spreading device according to claim 6, in combination with the milking stall, wherein the first and second raised surfaces slope at least partly in relation to the floor surface (3a) in the milking stall (3).

8. The leg spreading device according to claim 6, in combination with the milking stall, further comprising an additional element (10c) forming an additional raised surface, the additional element (10c) being at least partly between the first elongated element (10a) and the second elongated element (10b).

9. The leg spreading device according to claim 8, in combination with the milking stall, wherein the additional element (10c) is at least partly in front of the second longitudinal position (l2).

10. The leg spreading device according to claim 1, in combination with the milking stall, wherein the first elongated element (10a) and the second elongated element (10b) are symmetrically arranged on opposite sides of a central vertical longitudinal plane (3b) between said first and second elongated elements (10a, 10b).

11. The leg spreading device according to claim 1, in combination with the milking stall, wherein,
the first elongated element (10a) comprises a right side edge (10a2) arranged in parallel with the left side edge (10a1) of the first elongated element (10a), and
the second elongated element (10b) comprises a left side edge (10b2) arranged in parallel with the right side edge (10b1) of the second elongated element (10b).

12. The leg spreading device according to claim 1, in combination with the milking stall, further comprising an adjusting mechanism (24, 25) that provides adjustment of the transverse distance (w) between the left side edge (10a1) of the first elongated element (10a) and the right side edge (10b1) of the second elongated element (10b).

13. The leg spreading device according to claim 12, in combination with the milking stall, wherein the adjusting mechanism (24) provides adjustment of the first and second elongated elements (10a, 10b) at the first longitudinal position (l1) and thereby an adjustment of the first transverse distance (w1) at the first longitudinal position (l1).

14. The leg spreading device according to claim 12, in combination with the milking stall, wherein the adjusting mechanism (24) provides adjustment of the first and second elongated elements (10a, 10b) at the second longitudinal position (l2) and thereby an adjustment of the second transverse distance (w2) at the second longitudinal position (l2).

15. The leg spreading device according to claim 1, in combination with the milking stall, further comprising an elevating mechanism (23) that moves the first and second elongated elements (10a, 10b) between a raised position in which an upper surface of the first and second elongated elements (10a, 10b) are at a first height above the floor surface (3a) in the milking stall (3) and a lowered position in which the upper surface of the first and second elongated elements (10a, 10b) are at a lower, second height above the floor surface (3a) than the first height in the raised position.

16. The leg spreading device according to claim 1, in combination with the milking stall, wherein the first and second elongated elements (10a, 10b) are separate units which are individually attached in the position on the floor surface of the milking stall.

17. The leg spreading device according to claim 1, in combination with the milking stall, further comprising a connected member (26) that connects the first and second elongated elements (10a, 10b) to each other such the first and second elongated elements (10a, 10b) are attached in the position on the floor surface of the milking stall (3) as a unit.

18. The leg spreading device according to claim 1, in combination with the milking stall, wherein,
the leg spreading device (10) is attached in the position on the floor surface of the milking stall (3) such that the first longitudinal position (l1) is located nearer a rear edge (2b) of the milking stall (3) than the second longitudinal position (l2),
said first and second elongated elements (10a, 10b) have a longitudinal length of at least 25 cm between the first longitudinal position (l1) and the second longitudinal position (l2),
the first transverse distance (w1) at the first longitudinal position (l1) is at least 16 cm, and
the first and second elongated elements (10a, 10b) form raised surfaces which are located at least 5 cm above a floor surface in the milking stall.

19. The leg spreading device according to claim 1, in combination with a milking stall, wherein,
the first elongated element (10a) comprises a right side edge (10a2) arranged opposite the left side edge (10a1) of the first elongated element (10a),
the second elongated element (10b) comprises a left side edge (10b2) arranged opposite the right side edge (10b1) of the second elongated element (10b),
the first and second elongated elements (10a, 10b) form raised surfaces which are located at least 5 cm above the floor surface in the milking stall,
said first and second elongated elements (10a, 10b) are mounted in the position in the milking stall (3) such that the first longitudinal position (l1) is located adjacent a rear edge (2b) of the milking stall (3), and
said first and second elongated elements (10a, 10b) have a longitudinal length of at least 25 cm between the first longitudinal position (l1) and the second longitudinal position (l2).

20. A leg spreading device (10) adapted to be attached on a floor surface of a milking stall (3), the leg spreading device (10) comprising:
a first elongated element (10a) forming a first raised surface (10a) defined by a left side edge (10a1); and
a second elongated element (10b) forming a second raised surface (10b) defined by a right side edge (10b1),
wherein the first and second elongated elements (10a, 10b) are adapted to be attached in a position on the floor surface of the milking stall (3) such that a transverse distance (w) between the left side edge (10a1) of the first raised surface and the right side edge (10b1) of the second raised surface increases continuously in a longitudinal direction of the first and second elongated elements (10a, 10b) from a first transverse distance (w1) at a first longitudinal position (l1) to a second transverse distance (w2) at a second longitudinal position (l2), and, when an animal (1) is standing in a milking position on the floor surface of the milking stall (3), the first and second raised surfaces (10a, 10b) are located between rear legs (1a, 1b) of the animal (1), wherein, with the leg spreading device (10) attached in the position on the floor surface of the milking stall (3), when an animal (1) is standing in a milking position on the floor surface of the milking stall (3), the first and second raised surfaces (10a, 10b) are located between the rear legs (1a, 1b) of the animal (1) standing in the milking position in the milking stall (3).

\* \* \* \* \*